United States Patent
Hermann

(10) Patent No.: US 11,460,533 B2
(45) Date of Patent: Oct. 4, 2022

(54) METHOD AND ARRANGEMENT FOR LOCALIZING A PORTABLE RADIO UNIT

(71) Applicant: Continental Automotive GmbH, Hannover (DE)

(72) Inventor: Stefan Hermann, Neunkirchen am Brand (DE)

(73) Assignee: Continental Automotive GmbH

(*) Notice: Subject to any disclaimer, the term of this patent is extended or adjusted under 35 U.S.C. 154(b) by 87 days.

(21) Appl. No.: 15/758,667

(22) PCT Filed: Aug. 24, 2016

(86) PCT No.: PCT/EP2016/069947
§ 371 (c)(1),
(2) Date: Mar. 8, 2018

(87) PCT Pub. No.: WO2017/042030
PCT Pub. Date: Mar. 16, 2017

(65) Prior Publication Data
US 2018/0252794 A1     Sep. 6, 2018

(30) Foreign Application Priority Data

Sep. 11, 2015 (DE) .................. 10 2015 217 413.1

(51) Int. Cl.
*G01S 5/02* (2010.01)
*B60R 25/24* (2013.01)

(52) U.S. Cl.
CPC .......... *G01S 5/0242* (2013.01); *B60R 25/245* (2013.01); *G01S 5/0252* (2013.01); *G01S 5/0268* (2013.01)

(58) Field of Classification Search
CPC .... G01S 5/0242; G01S 5/0252; G01S 5/0268; B60R 25/245
(Continued)

(56) References Cited

U.S. PATENT DOCUMENTS

| 2002/0024460 A1* | 2/2002 | Ghosh | ............... B60R 25/24 342/43 |
| 2003/0193388 A1* | 10/2003 | Ghabra | ............... B60R 25/24 340/5.61 |

(Continued)

FOREIGN PATENT DOCUMENTS

| DE | 19738323 C1 | 2/1999 |
| DE | 19809433 C1 | 6/1999 |

(Continued)

OTHER PUBLICATIONS

International Search Report and Written Opinion dated Dec. 2, 2016 from corresponding International Patent Application No. PCT/EP2016/069947.

(Continued)

*Primary Examiner* — Charles N Appiah
*Assistant Examiner* — Nicole M Louis-Fils

(57) ABSTRACT

A method for locating a portable radio unit (TF) within a predetermined area (AB, IB) of a vehicle (FZ) has the following steps. A first radio signal (FS1) is transmitted from a vehicle-based position (PO1) outside the vehicle. Further, a second radio signal (FS2) is transmitted from a vehicle-based position (PO2) inside the vehicle. Values (R1, R2) of the respective measured reception field strengths of the first and second radio signals at the location (OF) of the portable radio unit or a value derived therefrom is/are received. Finally, the location (OF) of the portable radio unit is ascertained on the basis of a comparison of the values of the respective measured reception field strengths. In this manner, a simple and reliable way of locating a portable radio unit is also made possible using radio-frequency radio signals.

19 Claims, 2 Drawing Sheets

(58) Field of Classification Search
USPC .......................................................... 455/456
See application file for complete search history.

(56) References Cited

U.S. PATENT DOCUMENTS

| | | | | |
|---|---|---|---|---|
| 2005/0046546 | A1* | 3/2005 | Masudaya | B60R 25/2072 340/5.61 |
| 2006/0164208 | A1* | 7/2006 | Schaffzin | G07C 9/00182 340/5.64 |
| 2008/0106375 | A1* | 5/2008 | Nakajima | B60R 25/245 340/5.72 |
| 2011/0105097 | A1* | 5/2011 | Tadayon | H04L 43/16 455/418 |
| 2012/0098717 | A1* | 4/2012 | Petrucci | H01Q 21/28 343/713 |
| 2012/0182122 | A1* | 7/2012 | Nishiguchi | B60R 25/245 455/69 |
| 2014/0129127 | A1* | 5/2014 | Kane | G01S 5/0036 701/300 |
| 2014/0148093 | A1* | 5/2014 | Nguyen | H04B 7/15507 455/11.1 |
| 2014/0354404 | A1* | 12/2014 | Lin | G07C 9/00182 340/5.64 |
| 2016/0031417 | A1* | 2/2016 | Kornek | B60R 25/245 701/2 |
| 2016/0086397 | A1* | 3/2016 | Phillips | B60R 16/037 701/32.4 |
| 2016/0205498 | A1* | 7/2016 | Takigawa | B60R 25/245 455/41.2 |
| 2017/0158169 | A1* | 6/2017 | Luo | B60R 25/245 |
| 2017/0190317 | A1* | 7/2017 | Hamada | B60R 25/241 |

FOREIGN PATENT DOCUMENTS

| | | |
|---|---|---|
| DE | 19836957 C1 | 9/1999 |
| DE | 10131102 A1 | 1/2003 |
| DE | 102004059179 A1 | 7/2006 |
| DE | 102008015938 A1 | 10/2008 |
| DE | 102011088917 A1 | 6/2013 |
| DE | 102012216843 B3 | 3/2014 |
| EP | 1189306 A1 | 3/2002 |
| EP | 1227017 A1 | 7/2002 |
| EP | 1721793 A1 | 11/2006 |
| JP | 2007170162 A | 7/2007 |
| JP | 2009027249 A * | 2/2009 |
| JP | 2012172334 A | 9/2012 |

OTHER PUBLICATIONS

Office Action dated May 10, 2016 from corresponding German Patent Application No. 10 2015 217 413.1.

Office Action dated Jun. 9, 2017 from corresponding German Patent Application No. 10 2015 217 413.1.

* cited by examiner

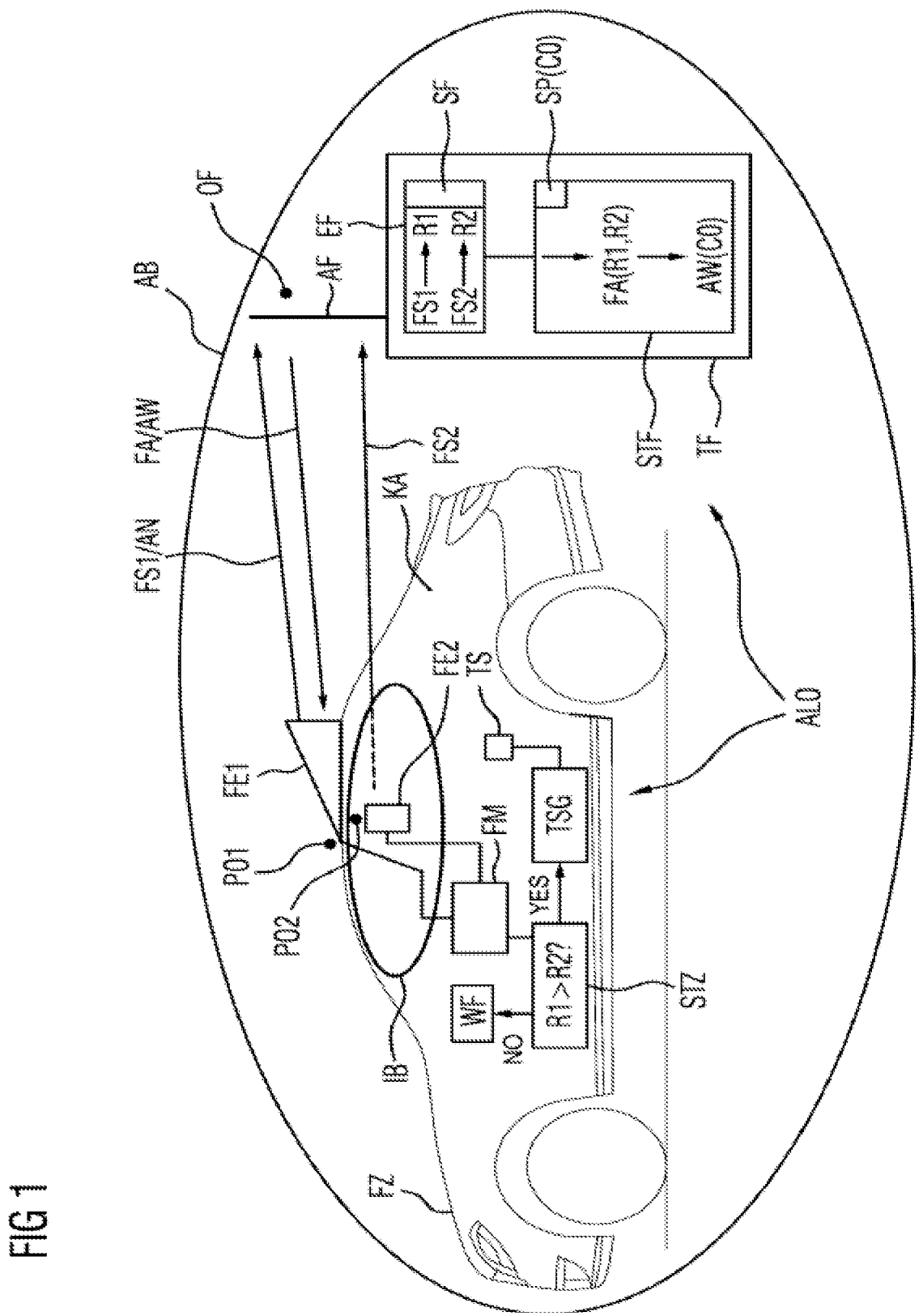

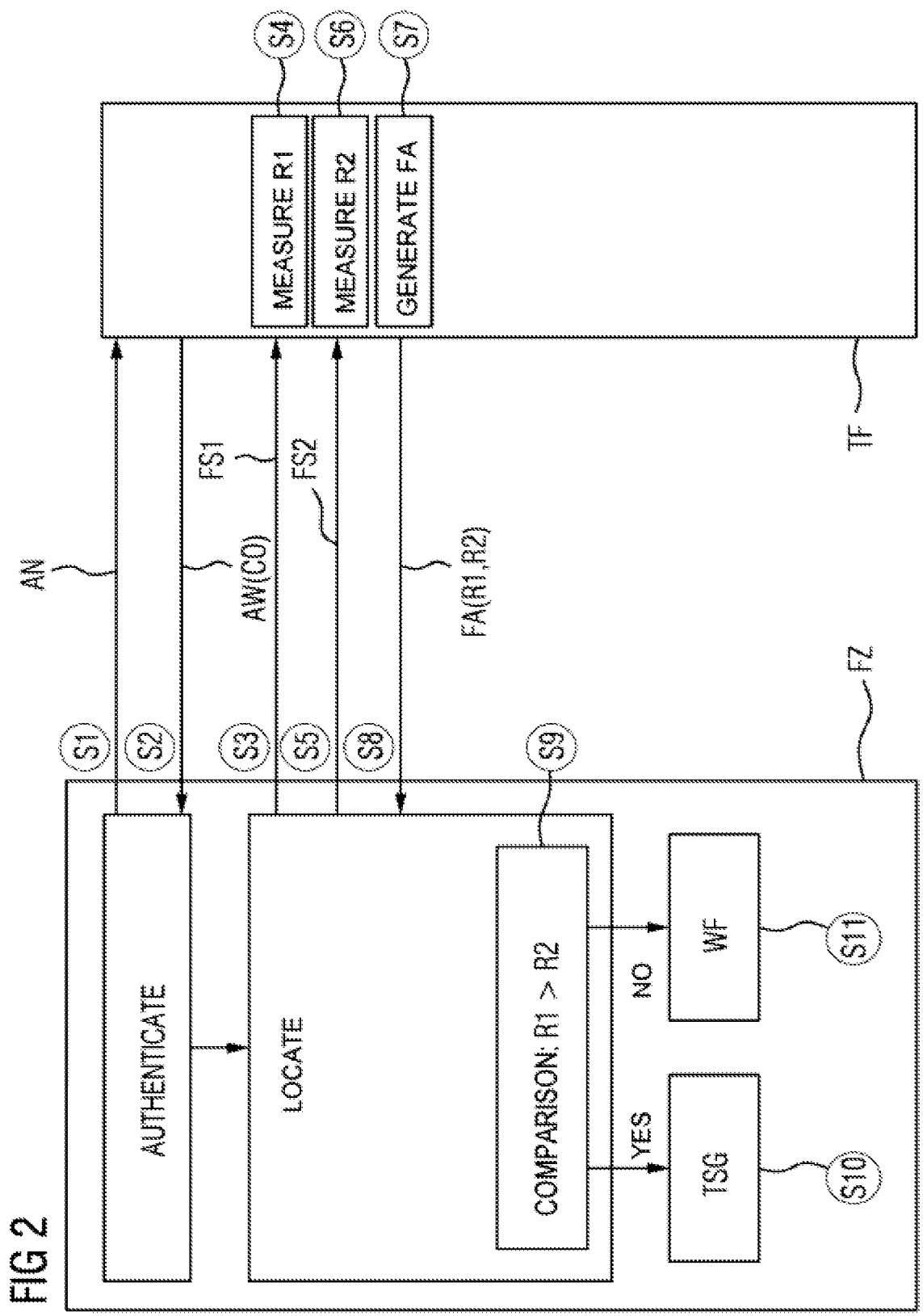

METHOD AND ARRANGEMENT FOR LOCALIZING A PORTABLE RADIO UNIT

The present invention relates to a method for locating a portable radio unit within a predetermined area of a vehicle. Further, it relates to an arrangement for locating the portable radio unit.

In vehicles today, starting systems or engine immobilizers belong to the standard equipment as part of a theft prevention device. In this regard, a radio communication is used to perform authentication in which an enquiry signal is transmitted to a portable radio unit (in particular an identification transmitter of a user) that is in the interior of the vehicle, whereupon the portable radio unit transmits a code back to a vehicle-based evaluation device. The latter will release the engine immobilizer and give engine starting clearance if the code transmitted by the portable radio unit is the same as a setpoint code.

Besides such starting systems for vehicles that have just been described, there are also entry systems in order to prevent unauthorised entry to a vehicle. What are known as passive entry systems or entry arrangements involve a first communication device of the vehicle first of all transmitting enquiry signals of a particular strength at regular intervals of time in order to check whether a portable radio unit (a mobile identification transmitter of a user) is in a predetermined area or sensing area of the vehicle or around the vehicle. If the portable radio unit approaches the vehicle and is finally able to receive the enquiry signals thereof, it will respond to the reception of an enquiry signal in order to initiate an authentication process. This involves data being interchanged in which the portable radio unit ultimately transmits its authentication code to the vehicle. If the authentication code is checked successfully, it is then possible for a user directly at the vehicle to operate a door handle in order to unlock the applicable vehicle door or all the vehicle doors. Since this requires no active operation of a mechanical or electrical identification transmitter or key to be performed by a user, this type of entry authorisation is also referred to as a passive entry authorisation check and the applicable entry authorisation systems are referred to as passive electronic entry authorisation systems (passive entry arrangements for short).

As just mentioned, a portable radio unit or a mobile identification transmitter of a user may be involved both in engine starting clearance and as part of a passive entry arrangement. In this case, however, engine starting clearance is supposed to be made possible only when the portable radio unit is inside, whereas door unlocking as part of an entry arrangement is supposed to be made possible only when the portable radio unit is outside.

It is therefore the object of the present invention to provide a simple way of locating a portable radio unit in a predetermined area of a vehicle.

This object is achieved by the subject matter of the independent claims. Advantageous configurations are the subject matter of the subclaims.

According to a first aspect of the invention, a method for locating a portable radio unit of a user within a predetermined area or sensing area of a vehicle having the following steps is provided:

First of all, a first radio signal is transmitted from a vehicle-based position outside the vehicle, this being able to be done by a first vehicle-based radio device outside the vehicle. Moreover, a second radio signal is transmitted from a vehicle-based position inside the vehicle. This can be done by a second vehicle-based radio device inside the vehicle.

Finally, values of a respective measured reception field strength of the first and second radio signals at the location of the portable radio unit are received. This can be done by a vehicle-based reception device. It is also conceivable to receive, instead of the values of the respective measured reception field strengths of the first and second radio signals at the location of the portable radio unit, one or more values derived therefrom. By way of example, it is conceivable to receive a difference value for the respective values of the measured reception field strength. Moreover, the location of the portable radio unit is ascertained on the basis of a comparison of the values of the respective measured reception field strengths. This can be done by a vehicle-based evaluation device. The use of two radio signals, one from outside and one from inside, ensures that regardless of where the portable radio unit is (outside or inside), one of the radio signals has a higher field strength at the location of the portable radio unit and the other has a lower field strength. This is due to an attenuation of the field strength of a radio signal by the vehicle bodywork, which separates the outside and the inside from one another. If the portable radio unit is inside the vehicle (in the passenger compartment), for example, then the attenuation of the field strength of the second radio signal will be lower than the attenuation of the field strength of the first radio signal. When the two radio signals are compared, and in particular in view of which radio signal has been transmitted from inside the vehicle and which one has been transmitted from outside the vehicle, it can be inferred that the portable radio unit is inside the vehicle in the example just mentioned, since the field strength from inside as measured by the portable radio unit is higher than the measured field strength of the radio signal from outside. Therefore, a simple way of locating the portable radio unit is made possible.

According to one configuration of the method, the respective transmission field strengths of the first and second radio signals are in the same decimal order of magnitude. In particular, they are identical. This ensures that there is an applicable attenuation of one of the two radio signals by the vehicle bodywork by a sufficient amount to allow a reliable distinction or a comparison of the values of the respective measured reception field strengths and therefore reliable location of the portable radio unit.

According to a further configuration, the vehicle-based position outside the vehicle is close to the vehicle-based position inside the vehicle. In particular, it is possible for the two positions to be in the roof area of the vehicle bodywork, where they are separated from one another by the bodywork. It is also possible for the two positions to be in or on the vehicle door, where they are again separated from one another by the bodywork material, to be more precise by the sheet metal of the door. It is thus conceivable for, by way of example, the first radio signal to be transmitted by an external antenna as first vehicle-based radio device (in the roof area, door area, etc.), while the second radio signal is transmitted by an internal antenna as second vehicle-based radio device, the two antennas being separated from one another merely by the respective part of the bodywork, but otherwise advantageously being opposite one another. This further provides a good way of distinguishing the reception field strength of the first and second radio signals, since it ensures that an attenuation of one radio signal in comparison with the other radio signal is achieved.

According to a further configuration, a location of the portable radio unit outside the vehicle is ascertained if the comparison of the respective measured reception field strengths reveals that the value of the measured reception field strength of the first radio signal is greater than the value of the measured reception field strength of the second radio signal. Accordingly, the location of the portable radio unit inside the vehicle can be ascertained if the comparison of the values of the respective measured reception field strengths reveals that the value of the measured reception field strength of the second radio signal is greater than the value of the measured reception field strength of the first radio signal. This provides a simple way of distinguishing between inside/outside.

Preferably, the first and second radio signals are a radio-frequency signal. This may be a signal in the MHz range, such as in the 433 MHz range, for example, but also a signal in the GHz range, such as in a Bluetooth frequency band (also Bluetooth low energy frequency band) in the 2.4 GHz or 5 GHz range, for example. In particular when a frequency used according to the Bluetooth standard is used, it is conceivable for the portable radio unit to be in the form of a device carriable by a user, such as a smartphone, a smartcard, a smartwatch, for example, or in the form of an applicable radio key, that can communicate on an applicable Bluetooth frequency.

According to a further aspect of the invention, an arrangement for locating a portable radio unit within a predetermined area or sensing area of a vehicle is provided that comprises the following features. It has a first vehicle-based radio device for transmitting a first radio signal from a position outside the vehicle. Further, it has a second vehicle-based radio device for transmitting a second radio signal from a position inside the vehicle. Moreover, it has a vehicle-based reception device for receiving values of the respective measured reception field strengths of the first and second radio signals at the location of the portable radio unit or one or more values derived therefrom. Moreover, it has an evaluation device for ascertaining the location of the portable radio unit on the basis of a comparison of the values of the respective measured reception field strengths. Therefore, an arrangement for locating a portable radio unit is provided that is easily realizable and is also designed for radio-frequency radio signals, since in this case shielding of radio signals also as a result of reflections from the vehicle bodywork is purposely used to perform the location determination by means of comparison of the reception field strengths of a radio signal from the outside and a radio signal from the inside.

According to one configuration of the arrangement, said arrangement further has a portable radio unit having the following features. A portable radio unit in this case has a radio-unit-based reception device for receiving the first and second radio signals, and for measuring the reception field strength of the first and second radio signals at the location of the portable radio unit. Further, it has a radio-unit-based transmission device for transmitting the respective measured reception field strengths of the first and second radio signals. It is also conceivable for the radio-unit-based transmission device to transmit a value or values derived from the respective measured reception field strengths of the first and second radio signals. By way of example, a difference in the reception field strengths of the first and second radio signals can be transmitted.

According to a further aspect of the invention, a vehicle having an above arrangement or a configuration thereof is provided.

According to one configuration of the vehicle, said vehicle has an outside and an inside. Moreover, it has a bodywork that separates the outside from the inside, wherein the first vehicle-based radio device is arranged on the outside of the bodywork and the second vehicle-based radio device is arranged on the inside of the bodywork, in particular in the roof area or in the door area in each case. This allows a good way of distinguishing the reception field strength of the radio signal from the first vehicle-based radio device on the outside of the bodywork and of the radio signal from the second vehicle-based radio device on the inside of the bodywork.

Advantageous configurations of the method can, insofar as applicable to the arrangements of the vehicle, also be regarded as advantageous configurations of the arrangements of the vehicle, and vice versa.

Exemplary embodiments of the present invention will now be explained below with reference to the accompanying drawings, in which:

FIG. 1 shows a schematic depiction of an arrangement for locating a portable radio unit in the sensing area of a vehicle according to an embodiment of the invention;

FIG. 2 shows a flowchart to depict the method for locating a portable unit according to an embodiment of the invention.

Let us now refer to FIG. 1, which shows a locating arrangement ALO with its essential components according to an embodiment of the invention. In this case, the arrangement ALO has multiple components that are vehicle-based or arranged in or on a vehicle FZ. These include a first vehicle-based radio device FE1 that is arranged at a first position PO1 outside AB the vehicle FZ, in this case on a roof of the vehicle FZ. This first vehicle-based radio device FE1 is set up to transmit one or more radio signals FS1 from the position PO1 outside the vehicle. Moreover, the arrangement ALO comprises a second vehicle-based radio device FE2 that is arranged at a second position PO2 inside IB the vehicle, in this case the passenger compartment. In this case, the second vehicle-based radio device FE2 is set up to transmit one or more second radio signals from the position PO2 inside the vehicle. The vehicle-based radio device FE2 may be arranged on the roof lining of the vehicle FZ in this case. In particular, the two vehicle-based radio devices are in direct proximity to one another, as in FIG. 1 merely separated by the bodywork in the roof area of the vehicle, in order to be able to supply reliable results for the locating process, in particular the distinguishing between inside/outside.

The vehicle-based radio devices can have antennas in this case that are designed to transmit radio-frequency signals, in particular in a Bluetooth frequency band at 2.4 GHz. The two vehicle-based radio devices FE1 and FE2 are connected to a vehicle-based radio module FM that is designed to actuate or drive the two vehicle-based radio devices so that they transmit their radio signals FS1 and FS2. Moreover, the radio module FM is set up to receive radio signals, such as, for example, a radio signal FA that is transmitted by a portable radio unit TF, which will be explained in more detail later. The radio signal FA can then be received via either the first vehicle-based radio device FE1 or the second vehicle-based radio device FE2 and forwarded to the radio module FM. The radio signal FA may also be a radio-frequency signal, in particular in a Bluetooth frequency band at 2.4 GHz. The radio module FM is moreover connected to a vehicle-based control device STZ that is designed to evaluate the information included in the radio signal FA.

Besides these vehicle-based components of the arrangement ALO, said arrangement further comprises a portable radio unit TF. This has a radio-unit-based reception device EF for receiving the first and second radio signals FS1 and FS2, and for measuring the reception field strength R1 of the first radio signal FS1 and for measuring the reception field strength R2 of the second radio signal FS2 at the location OF of the portable radio unit TF. The radio-unit-based reception device EF is connected to a radio-unit-based control device STF that packs the two obtained values R1 and R2 of the measured reception field strengths into the radio signal FA and transmits them, or returns them to the vehicle, via a radio-unit-based transmission device SF and the radio-unit-based antenna AF.

Let us refer once again to the vehicle-based control device STZ, the task of which is to ascertain the location OF of the portable radio unit TF. In this case, the vehicle-based control device STZ compares the two values R1 and R2 of the respective measured reception field strengths of the radio signals FS1 and FS2. If the value R1 of the reception field strength of the first radio signal is greater than the value R2 of the measured reception field strength of the second radio signal FS2, then this means that the portable radio unit TF is outside AB the vehicle, since the radio signal FS2 has been able to get to the radio-unit-based antenna AF unimpeded, in contrast to the second radio signal FS2 of the second vehicle-based radio device FE2, which first of all propagated unimpeded inside IB the vehicle (depicted by the dashed line depicted somewhat thicker) and then, attenuated by the vehicle bodywork KA, has a lower field strength (depicted by the continuing thinner line with the arrow for the signal FS2). Accordingly, the value R2 of the measured reception field strength at the location OF of the portable radio unit TF will be lower than the measured field strength R1 of the first radio signal FS1. Accordingly, the arrow of the radio signal FS1 is also depicted somewhat thicker here than the arrow of the radio signal FS2 after attenuation by the vehicle bodywork.

If, as just explained above, it has been established that the location OF of the portable radio unit TF is outside the vehicle, then the vehicle-based control device STZ can trigger the applicable vehicle functions. From the location outside AB the vehicle FZ, it can be concluded that a driver or user (not depicted) wishes to gain entry to the vehicle by means of authentication using his portable radio unit TF, so that, on location outside, the vehicle-based control device STZ outputs an applicable signal to a door controller TSG so that the latter prompts a door lock TS to be unlocked.

If the portable radio unit TF is located inside IB the vehicle FZ, i.e. in the passenger compartment, on the other hand, the value R2 of the measured reception field strength of the second radio signal FS2 being greater than the value R1 of the measured reception field strength of the first radio signal FS1, then it can be expected that a driver carrying the portable radio unit TF wishes to start the drive motor of the vehicle, so that in this case an engine immobilizer WF is released by an applicable signal.

The portable radio unit TF may in this case be a conventional radio key, for example, but also a personal portable item carriable by a user or driver, such as a smartphone, a smartwatch, smart glasses, each equipped with an applicable radio interface or an applicable radio-unit-based reception device EF and a radio-unit-based transmission device SF to interchange the cited radio signals with the vehicle FZ.

Let us now refer to FIG. 2, which shows a flowchart to unlock a vehicle door or to release an engine immobilizer using a method for locating a portable unit according to an embodiment of the invention.

In this case, it is assumed that a driver or user (not depicted) approaches the vehicle FZ with his portable radio unit TF. The vehicle FZ or the radio module FM uses the first and/or second vehicle-based radio device FE1 or FE2 to transmit radio signals AN at regular intervals of time. If the portable radio unit TF approaches the vehicle such that it enters the sensing area of the vehicle, i.e. that in particular a first radio signal FS1 can be received by the portable radio unit TF, then the sequence depicted in FIG. 2 is now supposed to begin. It is therefore assumed that, as depicted in FIG. 1, the portable radio unit TF is within the sensing area of the vehicle FZ, said sensing area also being able to be equated with the outside AB depicted in FIG. 1 in this case for the purposes of illustration.

In a step S1, the first vehicle-based radio device FE1 transmits a radio signal, in this case referred to as an enquiry signal AN, from the first vehicle-based radio device FE1 to the portable radio unit TF. This enquiry signal AN wakes up the portable radio unit TF or the components thereof, the reception of the enquiry signal AN via the radio-unit-based antenna AF and the radio-unit-based reception device EF prompting the radio-unit-based control device STF to pack a code CO stored in a memory SP into a response signal AW. Accordingly, the radio-unit-based control device STF prompts the radio-unit-based transmission device SF to transmit the response signal with the code CO to the vehicle via the radio-unit-based antenna AF in step S2. If the transmitted code CO corresponds to a predetermined code stored in the vehicle or in the vehicle-based control device STZ, then the authentication of the portable radio unit TF to the vehicle FZ has been positive and the sequence is continued by locating the portable radio unit.

As has already been indicated briefly in regard to FIG. 1, the locating of the portable radio unit TF now begins with the transmission of a first radio signal FS1 by the first vehicle-based radio device FE1 in a step S3. In step S4, the reception field strength is measured at the location OF of the portable radio unit TF and a corresponding value R1 is determined. Moreover, at a time staggered from the transmission of the first radio signal FS1, the second radio signal FS2 is transmitted by the second vehicle-based radio device FE2 in step S5. For this signal too, the reception field strength is measured at the location OF of the portable radio device TF and a corresponding value R2 is determined in step S6. In a step S7, the radio-unit-based control device STF then generates a radio signal FA as a response signal that includes the two values R1 and R2. In this case, it is also conceivable to pack, instead of the values themselves, a difference value for R1 and R2, for example a value R1-R2, into the signal FA and transmit it back to the vehicle in a step S8.

After this first part of the locating process, in which radio signals have been interchanged between the vehicle FZ and the portable radio unit TF, the evaluation now begins. In a step S9, this involves the values R1 and R2 transmitted by the portable radio unit TF being compared with one another. This involves the vehicle-based control device STZ checking whether the value R1 is greater than the value R2, for example. If this is the case, then it can be concluded that the portable radio unit TF is outside the vehicle, since the first radio signal FS1, which has been able to reach the portable radio unit TF, has not been attenuated by the bodywork, in contrast to the second radio signal FS2. Accordingly, the vehicle-based control device STZ will transmit an applicable signal to the door controller TSG so that it unlocks a door lock TS, for example, in order to grant the user of the portable unit TF entry to the vehicle.

If the comparison of step S9 reveals that the value R2 is greater than the value R1, for example because the user of the portable radio device TF is now sitting in the vehicle with it, and the first radio signal is attenuated inside IB by the vehicle bodywork, then this is interpreted as a sign that the driver or user wishes to drive the vehicle and accordingly wishes to start its drive motor. Accordingly, an engine immobilizer WF is then released in a step S11.

Advantageously, for reliable locating of the portable radio unit TF and for reliable distinction between inside/outside, the first vehicle-based radio device FE1 and the second vehicle-based radio device FE2 are arranged in direct proximity. Moreover, the transmission field strength of the first radio signal FS1 and of the second radio signal FS2 are in the same decimal order of magnitude, and are in particular of the same magnitude. The use of two radio signals, one from inside and the other from outside, and the comparison of the two reception field strengths at the location of a portable radio unit mean that it is therefore conceivable to use the depicted method according to an embodiment of the invention to also be able to use radio-frequency radio signals.

The invention claimed is:

1. A method for locating a portable radio unit within a predetermined area of a vehicle, comprising the steps of:
   transmitting a first radio signal with a first vehicle-based radio device from a vehicle-based position outside the vehicle;
   transmitting a second radio signal with a second vehicle-based radio device from a vehicle-based position inside the vehicle, the vehicle-based position inside the vehicle and the vehicle-based position outside the vehicle being in direct proximity to one another, the outside and inside vehicle-based positions each being opposite of one another and separated from one another merely by bodywork of one of a roof and a door of the vehicle;
   receiving at least one of: values of respective measured reception field strengths of the first and second radio signals at a location of the portable radio unit and a value derived therefrom;
   ascertaining the location of the portable radio unit by comparing the values of the respective measured reception field strengths of the first and second radio signals at the location of the portable radio unit to each other;
   wherein the first and the second radio signals are radio-frequency signals; and
   wherein the first radio signal is received at the portable radio unit unimpeded while the second radio signal is first propagated unimpeded inside the vehicle and then attenuated by the bodywork to have a lower field strength at the location of the portable radio unit than the first radio signal.

2. The method as claimed in claim 1, wherein respective transmission field strength of the first and second radio signals are in same decimal order of magnitude.

3. The method as claimed in claim 1, wherein the vehicle-based position outside the vehicle is close to the vehicle-based position inside the vehicle.

4. The method as claimed in claim 1, wherein the location of the portable radio unit outside the vehicle is ascertained if the comparison of the values of the respective measured reception field strengths reveals that the value of the measured reception field strength of the first radio signal is greater than the value of the measured reception field strength of the second radio signal.

5. The method as claimed in claim 1, wherein the location of the portable radio unit inside the vehicle is ascertained if the comparison of the values of the respective measured reception field strengths reveals that the value of the measured reception field strength of the second radio signal is greater than the value of the measured reception field strength of the first radio signal.

6. The method as claimed in claim 1, wherein the first and second radio signals are in a 433 MHz frequency band.

7. The method as claimed in claim 1, wherein the first and second radio signals are in a 2.4 GHz frequency band.

8. The method as claimed in claim 1, wherein the first and second radio signals are in a 5 GHz frequency band.

9. The method as claimed in claim 1, wherein the portable radio unit is at least one of a smartphone, a smartcard, a smartwatch and a radio key.

10. An arrangement for locating a portable radio unit within a predetermined area of a vehicle, comprising:
    a first vehicle-based radio device configured to transmit a first radio signal from a position outside the vehicle;
    a second vehicle-based radio device configured to transmit a second radio signal from a position inside the vehicle, the position inside the vehicle and the position outside the vehicle being in direct proximity to one another, opposite of one another and separated from one another merely by bodywork of one of a roof and a door of the vehicle;
    a vehicle-based reception device configured to receive values of respective measured reception field strengths of the first and second radio signals at a location of the portable radio unit;
    an evaluation device configured to ascertain the location of the portable radio unit by comparing the values of the respective measured reception field strengths of the first and second radio signals at the location of the portable radio unit to each other;
    wherein the first and the second radio signals are radio-frequency signals; and
    wherein the first radio signal is received at the portable radio unit unimpeded while the second radio signal is first propagated unimpeded inside the vehicle and then attenuated by the bodywork to have a lower field strength at the location of the portable radio unit than the first radio signal.

11. The arrangement as claimed in claim 10, further comprising:
    a portable radio unit comprising:
       a radio-unit-based reception device configured to receive the first and second radio signals, and configured to measure the reception field strengths of the first and second radio signals at the location of the portable radio unit; and
       a radio-unit-based transmission device configured to transmit at least one of: the values of the respective measured reception field strengths of the first and second radio signals and a value derived therefrom.

12. The arrangement as claimed in claim 10, further comprising the vehicle.

13. The arrangement as claimed in claim 12, wherein the vehicle comprises
    the bodywork that separates an outside from an inside, and wherein the first vehicle-based radio device is arranged on the outside of the bodywork and the second vehicle-based radio device is arranged on the inside of the bodywork.

14. The method as claimed in claim 1, wherein the outside and inside vehicle-based positions are opposite of one another and separated from one another by sheet metal comprised in the bodywork.

15. The arrangement as claimed in claim 10, wherein the positions outside and inside the vehicle are opposite of one another and separated from one another by sheet metal comprised in the bodywork.

16. The arrangement as claimed in claim 10, wherein the first and second radio signals are in a 433 MHz frequency band.

17. The arrangement as claimed in claim 10, wherein the first and second radio signals are in a 2.4 GHz frequency band.

18. The arrangement as claimed in claim 10, wherein the first and second radio signals are in a 5 GHz frequency band.

19. The arrangement as claimed in claim 10, wherein the portable radio unit is at least one of a smartphone, a smartcard, a smartwatch and a radio key.

* * * * *